H. H. HATHEWAY.
Hop-Picking Machine.
No. 203,910. Patented May 21, 1878.
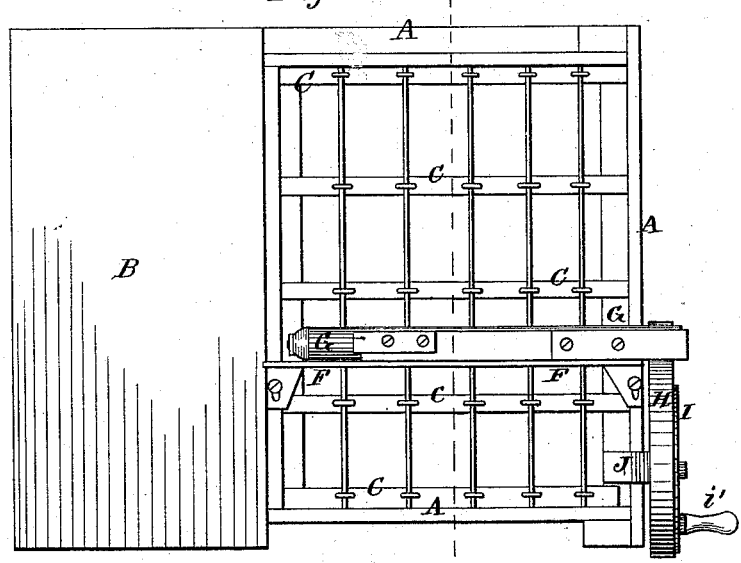
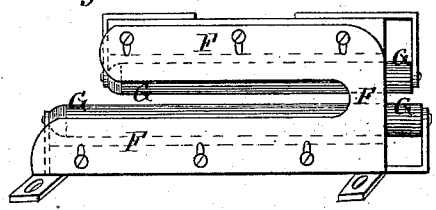
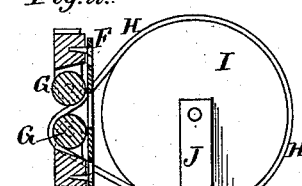
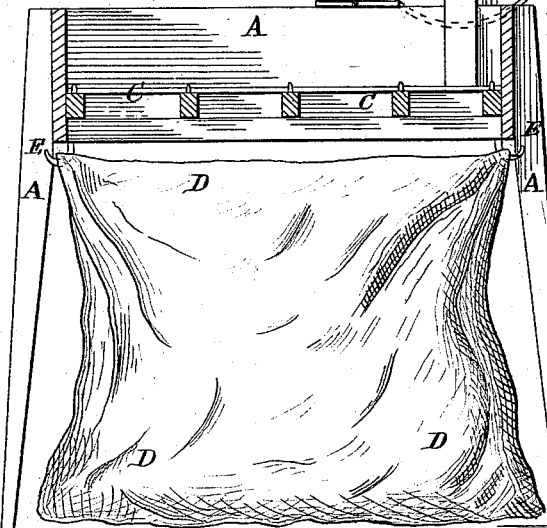
WITNESSES:
Henry N. Miller
C. Sedgwick
INVENTOR:
H. H. Hatheway
BY Munn & Co.
ATTORNEYS.

UNITED STATES PATENT OFFICE.

HENRY H. HATHEWAY, OF CLOCKVILLE, NEW YORK.

IMPROVEMENT IN HOP-PICKING MACHINES.

Specification forming part of Letters Patent No. 203,910, dated May 21, 1878; application filed February 27, 1878.

*To all whom it may concern:*

Be it known that I, HENRY H. HATHEWAY, of Clockville, in the county of Madison and State of New York, have invented a new and useful Improvement in Hop-Picking Machines, of which the following is a specification:

Figure 1 is a top view of my improved machine. Fig. 2 is a vertical section of the same, taken through the line *x x*, Fig. 1. Fig. 3 is a detail view of the rollers.

Similar letters of reference indicate corresponding parts.

The object of this invention is to furnish an improved machine for picking hops from the vines which shall be simple in construction, convenient in use, effective in operation, and inexpensive in manufacture.

The invention will first be described in connection with the drawing, and then pointed out in the claim.

A is the frame of the machine, which may be made of any convenient size and height. To one part of the top of the frame A is attached a platform, B, to serve as a table to receive the hop-vines. In the other part of the frame A is secured a screen, C, with meshes of such a size that the hops will pass through readily, but not large leaves and small stems.

Beneath the screen C is placed a sack, D, to receive the hops, and which is hooked upon hooks E, attached to the frame A. To the frame A, toward one end, and at right angles with the table B, is attached a vertical plate or frame, F, to which are attached bearings, in which revolve the journals of the rollers G. The plate F has short vertical slots formed in its arms to receive the screws or bolts by which the bearings for the rollers G are secured to the said plate, so that the said rollers can be adjusted farther apart or closer together, according as large or small hops are to be picked.

The rollers G may be made smooth or rough, and may be left plain, or may be covered with rubber or other suitable material.

The plate F is slotted from its inner end opposite the space between the rollers G. The upper part of the plate F and the upper roller G are made shorter than the lower part of the said plate and the lower roller, as shown in Fig. 3.

Around the end of one of the rollers G passes a belt, H, which also passes around a wheel, I, pivoted to a support, J, attached to the frame A. The wheel I is provided with a crank-pin, *i'*, to serve as a handle in operating the machine. The end of the other roller G may rest against the back of the belt H, so that both the rollers G may be driven by the said belt.

In using the machine, the vines may be drawn between the rollers butt-end forward, or they may be drawn across the projecting part of the lower roller G, and the arms or branches upon which the hops grow may be guided so as to pass between the rollers; or the poles, with the vines still upon them, may be drawn across the projecting end of the lower roller G, and the branches guided between the rollers.

By this construction the rollers G will strip every hop from the vines, the hops falling through the screen C into the sack D, and the large leaves and broken stems being kept out by the screen C, from which they may be occasionally removed.

A few small leaves will pass through the screen C, which can be removed at a subsequent operation. When the sack is full it is removed and replaced by another.

The machine is operated most advantageously by three persons—one to pull and strip the poles, one to draw the vines through the machine, and one to turn it. It may, however, be operated by two persons, or even by one. In the latter case the vines should be cut into lengths, so that the operator can feed the machine with one hand while he turns it with the other.

In feeding the machine, the vines are drawn toward the operator butts foremost, and between the rollers, by passing them in at the ends of the said rollers.

The machine may be made double by extending the frame and rollers sufficient for another screen and sack. Then one more person will be needed to feed the other ends of the rollers, as before fully described, while one person turns for both pickers from the center of the rollers with one wheel, as before described in single machines.

Having thus described my invention, I claim as new and desire to secure by Letters Patent—

The combination, with the table B on frame A, of the slotted plate F, the rollers G, beveled at their ends, and the lower of which protrudes beyond the other, to serve as a guide, and suitable mechanism for rotating said rollers, substantially as and for the purpose described.

H. H. HATHEWAY.

Witnesses:
LE GRAND COLTON,
CHARLES L. HOBART.